Patented Feb. 18, 1930

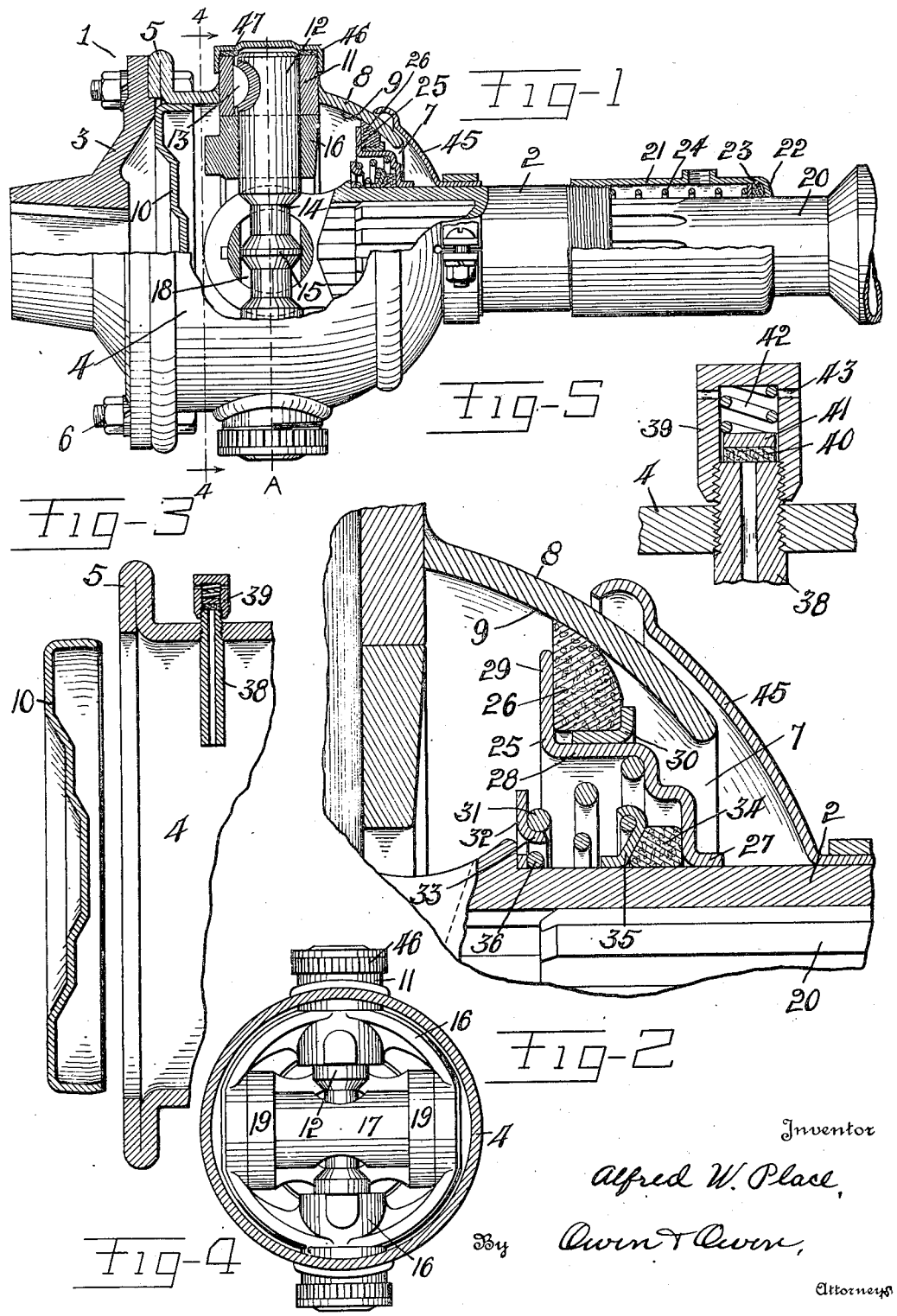

1,747,529

UNITED STATES PATENT OFFICE

ALFRED W. PLACE, OF BOWLING GREEN, OHIO, ASSIGNOR TO THE UNIVERSAL MACHINE COMPANY, OF BOWLING GREEN, OHIO, A CORPORATION OF OHIO

UNIVERSAL JOINT

Application filed September 29, 1927. Serial No. 222,697.

This invention relates to the universal joints, and particularly to those of the type intended to retain oil as a lubricant and for use in connection with motor-driven cars. It also relates to improvements on the housing claimed in Patent No. 1,265,834, dated May 14, 1918.

It is found in practice that the use of joints of this character in connection with motor cars is one of the hardest uses to which such joints are subjected, inasmuch as the joints must withstand the vibration and the distorting and twisting strains to which subjected by the cars passing over rough and uneven surfaces at high speeds. These joints when applied to motor cars are also disposed in a position close to the road so that the joints are exposed to the dust raised by the cars in dry weather and the mud and water thrown up by the cars in wet weather, thereby necessitating a tight joint to exclude such damaging agents from the interior thereof.

An object of the invention is to provide a strong and durable joint of the character described, which will stand up under practically all conditions of use to which subjected, will remain tight during such use, thereby effectually retaining the lubricant and excluding dust and dirt therefrom, and will not be injured by flying stones.

In practice, the oil is usually forced into these joints under high pressure, frequently resulting in injury to the joints when applied by inexperienced or careless persons, and causing the oil to escape from the joint and to drip therefrom or be thrown from the joints by centrifugal action when running so that the joints soon run dry without knowledge of the driver. Ordinarily, joints of this character are not sufficiently tight to prevent the forcing of lubricant therefrom under internal pressure, and the mechanic in filling the joint usually uses this feature in determining when the joint is full. In other words, when the lubricant begins to squeeze out from the joint the filling operation is discontinued.

An object of the invention is to make the joint so tight as to practically prevent, or at least reduce to a minimum the liability of leakage of the lubricant therefrom, under pressure or otherwise, and another object is to provide an attachment which will not only indicate to the person filling the joint when it is full, but will also serve as a safety relief for excessive or damaging pressures and will relieve the air content of a joint during filling. Other advantages will be apparent from the following description.

The invention is fully described in the following specification, and one embodiment thereof illustrated in the accompanying drawings, in which,—

Figure 1 is a side elevation of a joint embodying the invention with parts broken away in central longitudinal section. Fig. 2 is an enlarged fragmentary portion of Fig. 1. Fig. 3 is an enlarged fragmentary section of the rear end portion of the housing taken at right angles to the section of Fig. 1 and with the end closure member of the housing in position to be inserted therein. Fig. 4 is a reduced cross-section on the line 4—4 in Fig. 1, and Fig. 5 is an enlarged fragmentary section of the pressure safety device of the housing.

Referring to the drawings, 1 designates the housing member and 2 the companion member of a universal joint, which latter member for convenience may be termed the yoke member.

The housing member comprises a flange or collar 3 adapted to be secured to a shaft section, and a housing 4 bolted or otherwise secured to and carried by said flange. This housing is preferably stamped from sheet metal of a relatively heavy gauge and has its inner end, with respect to the flange 3, of cylindrical form and provided at its edge with an outwardly projecting annular flange 5 for closely seating against the outer edge portion of the flange 3, being clamped thereto by bolts 6. The outer end of the housing is provided with the customary opening 7 through which the yoke member 2 may be projected and have limited angular movement.

The improvement in the housing 4 over that of U. S. Patent No. 1,265,834 consists primarily in spherically restricting the outer end portion 8 of the housing to provide it with an interior spherical bearing surface at such end. This spherical portion extends from or adjacent to the opening 7 to the cross diametrical line A of the joint and is struck from the joint center and is of sufficient length to accommodate the permissible relative angular movement required of the joint members. The spherical bearing surface 9 thus formed is made perfectly smooth by machining and polishing. This is a very important feature of the joint.

The interior of the bushing 4 is closed to the flange 3 by a cup-shaped stamping 10, which is forced under pressure into the cylindrical end portion of the housing and is held therein by coaction at its outer edge with the flange 3. The flange of the member 10 forms a close joint with the housing and prevents the escape of lubricant from the housing at such end. It is found in practice that without this closure member the lubricant is forced outwardly through the seam or joint formed by the doubled over portion of the flange 5 and thence escapes around the bolts 6.

The housing 4 is provided at diametrically opposite sides with bearing bushings 11, secured by electric welding or otherwise in side openings provided in the housing and being coaxial with the cross-diametrical line A of the housing which intersects the joint axis. A cross-pin 12 extends through the housing 4 and is mounted at each end in the respective bushing 11, being secured against turning movement therein by a key 13. This pin has its central portion reduced, as shown at 14, and is provided centrally of such portion with a narrow-edged bearing flange 15. A ring 16 is mounted for rocking movements on the housing-pin 12, having diametrically opposed bearing openings therefor, and at right angles to such pin-receiving bearing openings it is provided with diametrically opposed openings in which the ends of a yoke-pin 17 are journalled. This pin is disposed at right angles to and is larger than the housing-pin 12. The axes of the pins 12 and 17 intercept, and the yoke-pin 17 is larger than the pin 12 and provided crosswise therethrough with an opening 18 through which the reduced portion 14 of the housing-pin extends, and in the center of which the pin flange 15 has a supporting bearing adapted to permit the two pins to have relative universal rocking movements.

The yoke member 2, as is customary with joints of this character, has its inner end disposed within the housing 4 and forked to straddle the housing-pin 12 and to have its ears or furcations 19 mounted on the yoke-pin 17, such mounting being preferably fixed so that the yoke-pin rocks within the ring 16 instead of within the yoke ears. The yoke member 2 projects outwardly through the housing opening 7 and is usually tubular in form and receives the end of a shaft section 20, which has axial sliding movements therein, the yoke and shaft section having interengaging splined connection to cause them to turn together. A shell 21 is threaded to the outer end of the yoke 2 and extends a distance outwardly therefrom in spaced relation to the shaft section 20 with its outer end inwardly flanged, as at 22, so as to restrict the shell opening at such end to substantially the size of the shaft. A gasket 23 is disposed within the outer end of the shell in close hugging engagement to the shaft and is held against the shell flange by a coiled expansion spring 24 within the shell. This shell has an opening adapted to be closed by a screw plug and through which a connection with the discharge tube of a lubricant force pump may be made, the lubricant being forced from the interior of the shell through the loose-fitting splines between the shaft section and yoke and into the interior of the housing.

A closure member 25 for the housing opening 7 is carried by the yoke 2 for axial sliding and preferably limited rocking movements thereon and carries at its outer edge a ring gasket 26 for sealing coaction with the polished spherical housing surface 9. The member 25, in the present instance, is of cup form with its bottom portion provided around its yoke-receiving opening with an outwardly projecting bearing flange 27, and with the free edge of its cylindrical sidewall portion 28 provided with the radially disposed, outwardly extending annular flange 29.

The gasket 26, which is preferably of cork, although it may be of any other material suitable for the purpose, is mounted around the cylindrical portion 28 of the cup collar and bears at its inner side, with respect to the center of the joint, against the flange 29 in opposition to its bearing against the spherical surface of the housing. A flanged keeper 30 of annular form is forced over the cylindrical portion 28 of the member 25 and cooperates with the flange 29 to retain the gasket in fixed relation on the member. It is preferable, in addition to providing a free fit between the member 25 and yoke 2, to also make the bearing flange 27 relatively short so as to facilitate a limited rocking of the member on the yoke without necessitating the provision of too free a fit between the yoke and member. In practice, it is important to permit such free relative movements of the closure member and yoke to permit limited relative rocking movements thereof and to prevent binding action occurring between the yoke and member when a slight cocking of the member on the yoke takes place.

The housing coacting surface of the gasket 26 terminates at its inner end, or that adjacent to the housing center, with a sharp edge intended to have scraping coaction with the polished bearing surface 9 of the housing so as to cut the oil film on such surface during movement of the gasket toward the inside of the joint. The outer surface of the gasket is preferably formed on a curve from such sharp edge, which curve is so struck that the bearing surface of the gasket preferably recedes from the coacting surface of the housing outwardly from the scraping edge of the gasket. The sharp edge of the gasket cuts the oil film on the bearing surface 9 of the housing just as the sharp edge on a piston ring cuts the oil film of the cylinder wall and keeps the oil from pumping up into the cylinder head of a gas engine. On the return or outward rocking movement of the gasket it passes over any oil film on the housing bearing surface without cutting the same, due to the gradual receding of the gasket surface away from the housing surface.

The polishing of the spherical gasket bearing surface of the housing performs two functions which in practice are found very important. First, the coaction of the gasket with the polished surface of the housing reduces to a minimum the thickness of the film of oil remaining on the polished surface during action and prevents a lubricant, especially oil, from working past the gasket during operation of the joint. It is found in practice that unless such housing surface is highly polished, more or less lubricant will escape from the joint between the gasket and housing during operation and especially when the lubricant is under high pressure within the joint, which frequently occurs. It has been found with this combination that no leakage will occur between the gasket and polish surface, even when sufficient pressure is applied within the joint as to straighten out or outwardly bulge the inwardly drawn circle portion of the housing closure member 10. Second, the polished bearing surface of the housing facilitates movement by centrifugal action of the oil film on such surface inwardly away from the gasket when the joint is being rotated at speed.

The gasket 26 is held yieldingly but quite firmly against the polished surface of the housing by a coiled expansion spring 31, which preferably gradually enlarges from its inner end outwardly, to permit it to be completely compressed within a small space, and has its inner end thrust against a thrust collar 32 on the yoke 2 and its outer end thrust against the member 25 in outwardly spaced relation to the yoke. The inner end of the spring 31 is held centered and spaced from the yoke by spurs 33 struck out from the collar 32. This collar has its inward thrust against a shoulder on the yoke. It is found in practice that very much better results are obtained by having the spring 31 coact with the closure member 25 in spaced relation to the yoke than if such thrust is against the member in close proximity to the yoke. It is also found in practice that the member 25 does not have the same tendency to lock on the yoke when cocked in one position or another as is the case where the spring thrust is against the member adjacent to the yoke, and in addition thereto the spring pressure is distributed to the member more closely to the line of contact of the gasket with the housing than would otherwise be the case.

In order to prevent oil from escaping from within the housing between the yoke 2 and the bearing of the closure member 25 thereon, a ring gasket 34, which may be referred to as the yoke gasket, bears against the inner edge portion of the collar 25 in close sliding engagement with the yoke 2. The inner end of this gasket, or the end thereof disposed towards the interior of the housing, is tapered outwardly away from the yoke and a pressure collar 35 is slidingly mounted on the yoke at the inner side of the gasket and has a complemental conically tapered surface in contact therewith so that pressure of the collar against the gasket will tend to crowd the gasket more closely around the yoke. A coiled expansion spring 36 is disposed within the spring 31 and has one end thrust against the collar 32 and its other end thrust against the collar 35, which latter collar is provided with a seat adjacent to its outer edge for receiving the spring thrust. The spring 36 is preferably lighter than the spring 31.

The primary purpose of making the member 25 cup-shaped is to facilitate assembling of the parts within a small space, as the springs 31 and 32 are thereby enabled to be enclosed within the member. This form of member also increases to some extent the oil retaining capacity of the housing and disposes the yoke bearing portion of the member adjacent to the outer end of the housing, while the gasket 26 is disposed a sufficient distance within the housing to permit of the desired relative angular movements of the yoke and housing while the gasket remains in contact entirely around its periphery with the spherical housing surface.

A very important advantage and one which is essential to joints lubricated by oil instead of grease is the disposition of the gasket 26 within the housing and in contact with the inner spherical surface thereof instead of with the outer side of the housing. By this arrangement pressure within the housing tends to more tightly seat the gasket against the housing surface than would be the case if the gasket were in contact with the outer side of the housing. Furthermore, with this arrangement the tendency of movement of the oil or oil film on the inner spherical surface of the housing is toward the interior of the housing, whereas if the gasket were disposed at the outer side of the housing the tendency would be to throw the oil by centrifugal action outwardly or away from the housing. The importance, therefore, of this feature cannot be too strongly emphasized.

In order to provide the housing with a pressure relief, a tube 38 is mounted in one side of the cylindrical portion of the housing, being open at its inner end to the interior of the housing. The outer end of the tube has a perforated cap 39 mounted thereon and enclosing a disc-like gasket 40, which seats against the end of the tube to close the opening thereof and the outer side of this gasket is preferably faced with a disc 41 of metal or other suitable stiff material. A spring 42 is disposed within the cap and has its inner end thrust against the gasket 40, 41. The tension of the spring and consequent seating pressure of the gasket against the tube end may be regulated by an adjustment of the cap on the tube. When a predetermined pressure is present in the housing an escape of pressure takes place around the gasket and through the perforations 43 in the cap. It is evident that during charging of the housing this safety relief permits an escape from the housing of the air content displaced by the lubricant, but also enables the lubricant to escape from the housing through this tube and thereby indicate when housing is full or a predetermined pressure has been obtained therein, to the person charging the same. In practice this is found to be a very important feature, as with the pressure charging devices now employed an enormous pressure can be exerted on the interior of the joint, and if the joint is tight, as is the case with the present joint, the interior parts may be and in fact are frequently injured and distorted by such pressure if no pressure indicating means is provided.

A splash guard 45 is secured around the yoke 2 without the spherical end of the housing 4 and has a spherical skirt portion enclosing the adjacent housing end. This guard, while complemental to, is preferably free from contact with the spherical portion of the skirt.

In order to prevent the escape of lubricant from the housing through the bushings 11 around the housing pins 12, a cap 46 is threaded on the outer end of each of said bushings and has an internal gasket 47 seating against the bushing end.

It is apparent that I have provided a universal joint which will retain oil as a lubricant under high pressure without leakage and during the twisting and distorting strains to which subjected when used in connection with motor cars; will effectually exclude dirt and road splash therefrom, thereby enabling the joint to be efficiently used for a long period under heavy load and at high speeds and to be completely lubricated during such period, the life of use of the joint with a single charge being only dependent on the length of wear of the lubricant before it has lost its efficient lubricating qualities, and will also enable the joint to be charged under high pressures without injury thereto and without leakage.

I wish it understood that my invention is not limited to any specific construction, arrangement or form of the parts, as it is capable of numerous modifications and changes without departing from the spirit of the claims, and also that while the joint is particularly adapted for the use of oil as a lubricant as distinguished from grease, it will be understood that it is not limited to the use of oil and that the term "oil", as used in the claims, is intended to include grease as a lubricant.

Having thus described my invention, what I claim as new and desire to secure by Letters Patent is:

1. A universal joint having a housing member with an opening in one end and a spherical interior surface surrounding and adjacent to said opening, a yoke member projecting outwardly from within the housing through said opening, a member movably carried by said yoke for cooperating therewith to close said opening and having a gasket portion in sealing sliding coaction with the spherical housing surface, a gasket encircling the yoke at the inner side of the closure member to seal the joint between the two, pressure means acting on said latter gasket to crowd it around the yoke and against the closure member, and spring means acting on the closure member without said yoke gasket for yieldingly retaining the closure member in sealing coaction with the housing member independently of the action of said pressure means on the yoke gasket.

2. A universal joint having a housing member with an opening in an end thereof and an interior smooth spherical surface adjacent to said opening, a yoke member projecting outwardly from within the housing member through said opening, a closure member carried by the yoke for movement relative thereto and having a peripheral sealing portion in sliding coaction with said spherical surface, said sealing portion having the inner end of the surface thereof which coacts with the housing terminating in a sharp oil film cutting edge and having the outer end of such surface gradually receding from the coacting housing surface, and means yieldingly retaining the closure member in yielding sealing coaction with the housing member.

3. In a universal joint, a housing having an opening in one end and an interior spherical surface adjacent to said opening, a yoke member projecting outwardly from within the housing through said opening, a closure member for said opening carried by the yoke for movements relative thereto, a ring gasket carried by the closure member in sealing coaction with the housing spherical surface and having the interior end of its housing coacting surface terminating in a sharp oil film cutting edge, means acting on the closure member to cause it to have a yielding outward sealing pressure against said housing surface, and means independently of said first means permitting the closure member to have movements relative to the yoke member and sealing the joint therebetween interiorly of the housing, and a dust guard carried by the yoke without the closure member and having a spherical portion overhanging the spherical end of the housing member.

4. In a universal joint boot seal, a boot having a substantially spherical end portion, the said portion having an opening through which a shaft extends, an annular closure plate located substantially within the said spherical portion, the closure plate having a cork washer disposed at the outer edge of the plate, the cork washer having a surface that normally extends at an acute angle to the inner surface of the spherical portion, means for pressing the plate to press the said cork surface against the substantially spherical surface of the boot to cause the said cork surface to conform to the inner spherical surface of the said portion.

5. A universal joint having a lubricant retaining housing member with an opening in an end thereof and an interior spherical surface adjacent to said opening, a yoke member projecting outwardly from within the housing through said opening, a closure member carried by the yoke for movement relative thereto and having an annular sealing portion in sliding coaction with said spherical surface, said sealing portion having the inner end of the surface thereof which coacts with the housing terminating in an oil film scraping edge and having the outer end of such surface non-oil-scraping in its action, whereby oil is stripped from the housing surface on an inward relative movement of the sealing portion, but not on an outward movement thereof, and means yieldingly acting on the closure member to retain it in sealing coaction with the housing member.

6. A universal joint having a housing member with an opening in one end and a spherical interior surface surrounding and adjacent to said opening, a yoke member projecting outwardly from within the housing through said opening, a member movably carried by said yoke for cooperating therewith to close said opening and having a sealing portion in sliding coaction with the spherical housing surface, a gasket encircling the yoke at the inner side of the closure member to seal the joint between the two, and independent spring means acting respectively on said yoke gasket and closure member interiorly of the housing to impart sealing action thereto.

7. A universal joint having a housing member with an opening in one end and a spherical interior surface surrounding and adjacent to said opening, a yoke member projecting outwardly from within the housing through said opening, a member movably carried by said yoke for cooperating therewith to close said opening and having a gasket portion in sealing sliding coaction with the spherical housing surface, a gasket encircling the yoke at the inner side of the closure member to seal the joint between the two, and independent spring means disposed interiorly of the housing and acting respectively on said yoke gasket and closure member, one without the other, and with different pressures to impart sealing actions thereto.

8. A universal joint having a housing member with an opening in one end and a spherical interior surface surrounding and adjacent to said opening, a yoke member projected outwardly from within the housing through said opening, a member movably carried by said yoke for cooperating therewith to close said opening and having a gasket portion in sealing sliding coaction with the spherical housing surface, a gasket encircling the yoke at the inner side of the closure member to seal the joint between the two, and independent coiled springs of conical form disposed interiorly of the housing member around the yoke member and having their large ends acting respectively against said yoke gasket and closure member, one without the other, for imparting yielding sealing actions thereto.

In testimony whereof I have hereunto signed my name to this specification.

ALFRED W. PLACE.